United States Patent
Hoeft et al.

(10) Patent No.: US 12,124,840 B2
(45) Date of Patent: Oct. 22, 2024

(54) USING VIEW LAYER IN DATABASE SYSTEM FOR ZERO DOWNTIME UPGRADE

(71) Applicant: SAP SE, Walldorf (DE)

(72) Inventors: Kerstin Hoeft, Stuttgart (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 346 days.

(21) Appl. No.: 17/411,141

(22) Filed: Aug. 25, 2021

(65) Prior Publication Data

US 2023/0068439 A1 Mar. 2, 2023

(51) Int. Cl.
*G06F 16/21* (2019.01)
*G06F 8/656* (2018.01)

(52) U.S. Cl.
CPC ............ *G06F 8/656* (2018.02); *G06F 16/213* (2019.01); *G06F 16/217* (2019.01)

(58) Field of Classification Search
CPC .... G06F 8/656; G06F 16/217; G06F 16/2282; G06F 11/3409; G06F 16/213; G06F 16/211; G06F 16/252; G06F 16/258; G06F 16/214; G06F 16/26; G06F 16/21; G06F 16/25; G06F 16/2365; G06F 16/2455
See application file for complete search history.

(56) References Cited

U.S. PATENT DOCUMENTS

| | | | |
|---|---|---|---|
| 9,436,724 B2 | 9/2016 | Driesen et al. | |
| 9,767,424 B2 | 9/2017 | Biewald et al. | |
| 9,891,909 B2 | 2/2018 | Konrad et al. | |
| 10,303,665 B2 | 5/2019 | Engelko et al. | |
| 2016/0085777 A1* | 3/2016 | Engelko | G06F 16/211 707/803 |
| 2018/0285390 A1* | 10/2018 | Mayer | G06F 16/25 |
| 2021/0373986 A1* | 12/2021 | Kruempelmann | H04L 67/10 |

* cited by examiner

*Primary Examiner* — Ajay M Bhatia
*Assistant Examiner* — Berhanu Mitiku
(74) *Attorney, Agent, or Firm* — Fish & Richardson P.C.

(57) ABSTRACT

Methods, systems, and computer-readable storage media for providing a first access schema in a view layer of the database system, the first access schema including first database objects and projection views, each projection view corresponding to a second database object of second database objects in a data persistency, transitioning access of sessions of an application from the data persistency to the first access schema, executing at least a portion of the maintenance procedure in the database system, the at least a portion of the maintenance procedure changing one or more second database objects within the data persistency, creating a second access schema, and transitioning access of the sessions of the application from the first access schema to the second access schema, transitioning access of the sessions of the application from the second access schema to the data persistency, and removing the second access schema from the database system.

20 Claims, 15 Drawing Sheets

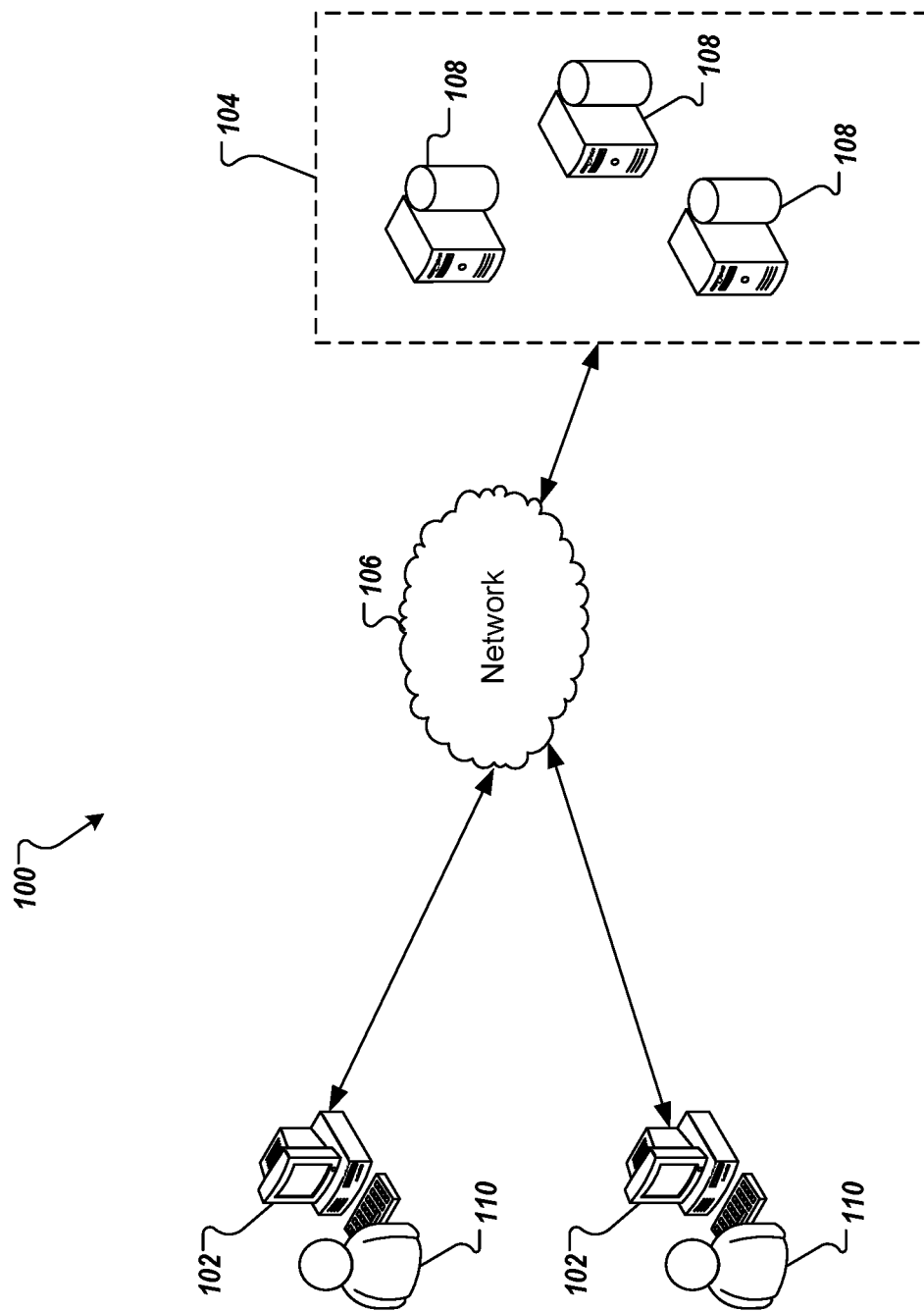

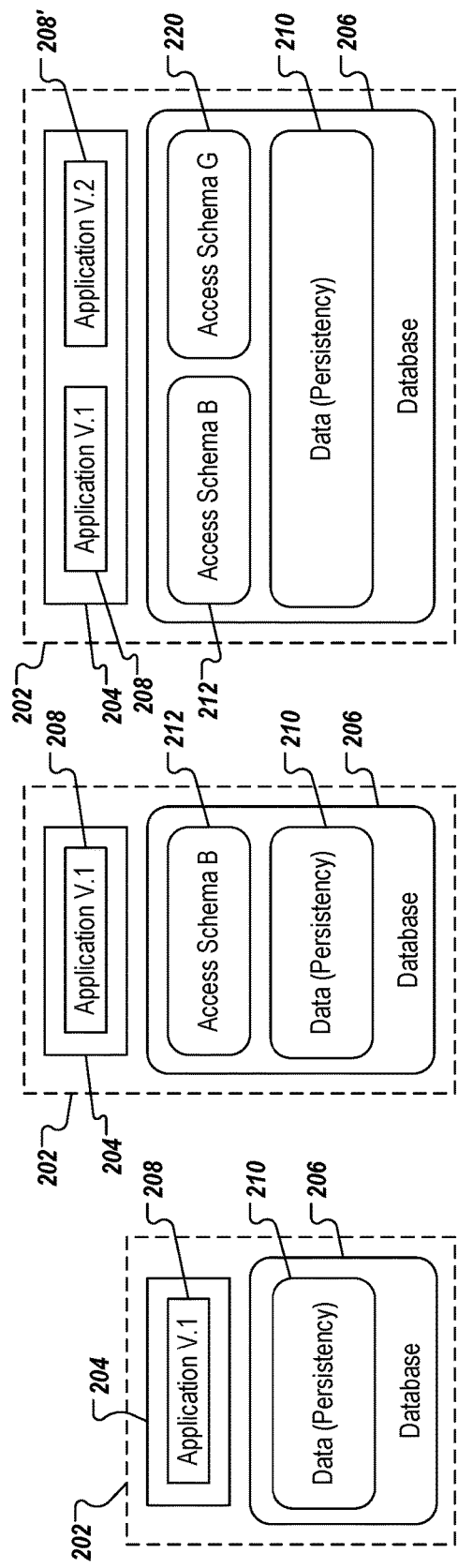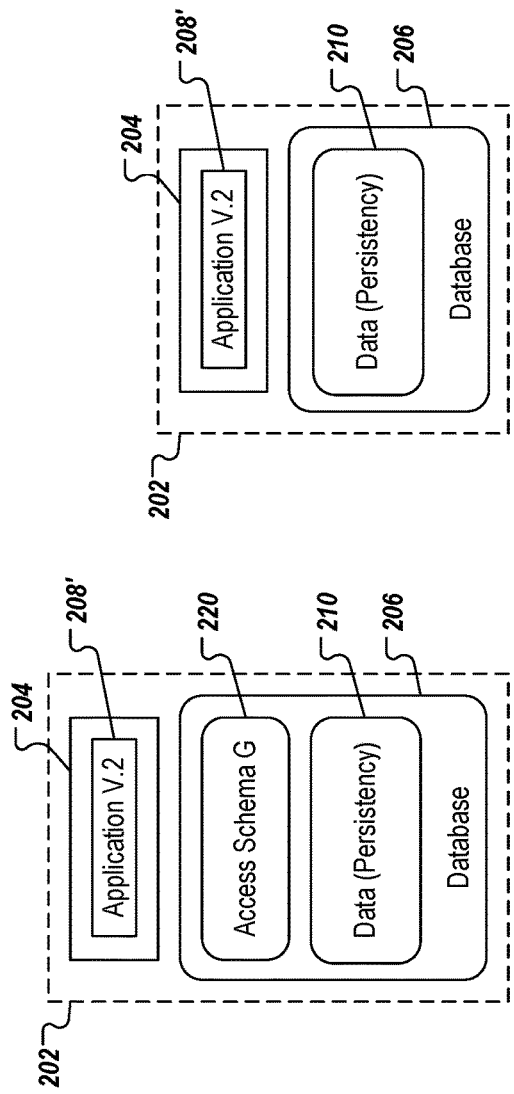

USING VIEW LAYER IN DATABASE SYSTEM FOR ZERO DOWNTIME UPGRADE

BACKGROUND

Entities, such as software developers and/or vendors, provide software and services. Example software can include enterprise software. In some examples, enterprise software can include application software (an application) that interacts with one or more databases. For example, an application can be hosted on one or more application servers and a user can interact with the application using a client device. In some examples, user interaction can result in data being read from, written to, and/or modified within one or more databases provided in one or more database systems.

During a lifecycle of the application and/or database, one or more maintenance operations may be required. Example maintenance operations include upgrading, patching, and testing. In order to perform such maintenance procedures, the application, and/or database may be taken offline, such that users are unable to interact with the application and/or database. This is referred to as downtime. Although software providers have strived to minimize downtime, achieving zero-downtime during such maintenance procedures can be difficult. An example goal for zero-downtime includes deploying an upgrade with a maximum read-only usage phase (e.g., maximum of 5 minutes).

SUMMARY

Implementations of the present disclosure are directed to minimizing downtime during upgrade of an application. More particularly, implementations of the present disclosure are directed to using a view layer within a database system to minimize downtime during upgrade of an application from a first version to a second version.

In some implementations, actions include providing a first access schema in a view layer of the database system, the first access schema including one or more first database objects and one or more projection views, each projection view corresponding to a second database object of one or more second database objects in a data persistency of the database system, transitioning access of sessions of an application from the data persistency of the database system to the first access schema, executing at least a portion of the maintenance procedure in the database system, the at least a portion of the maintenance procedure changing one or more second database objects within the data persistency, creating a second access schema, and transitioning access of the sessions of the application from the first access schema to the second access schema, transitioning access of the sessions of the application from the second access schema to the data persistency of the database system, and removing the second access schema from the database system. Other implementations of this aspect include corresponding systems, apparatus, and computer programs, configured to perform the actions of the methods, encoded on computer storage devices.

These and other implementations can each optionally include one or more of the following features: each second database object in the one or more second database objects includes content that one or more operations can be executed on; each first database object in the one or more first database objects is absent content that one or more operations can be executed on; transitioning access of sessions of an application from the data persistency of the database system to the first access schema includes configuring a second database connection of a database interface of the application to connect sessions of the application to the first access schema, and rolling sessions from a first database connection of the database interface to the second database connection; transitioning access of the sessions of the application from the second access schema to the data persistency of the database system includes configuring a second database connection of a database interface of the application to connect sessions of the application to the data persistency, and rolling sessions from a first database connection of the database interface to the second database connection; the one or more first database objects include one or more of a view, a filter rule, a dependency rule, and a stored procedure; and providing a first access schema in a view layer of the database system includes for each second database object including a table, creating a projection view to the table as a first database object of the one or more first database objects, and for each second database object including a sequence, creating a synonym to the sequence as a first database object of the one or more first database objects.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 1 depicts an example architecture that can be used to execute implementations of the present disclosure.

FIGS. 2A-2E depict an overview progression for minimizing downtime during upgrade of an application in accordance with implementations of the present disclosure.

Like reference symbols in the various drawings indicate like elements.

DETAILED DESCRIPTION

Figure 3A:
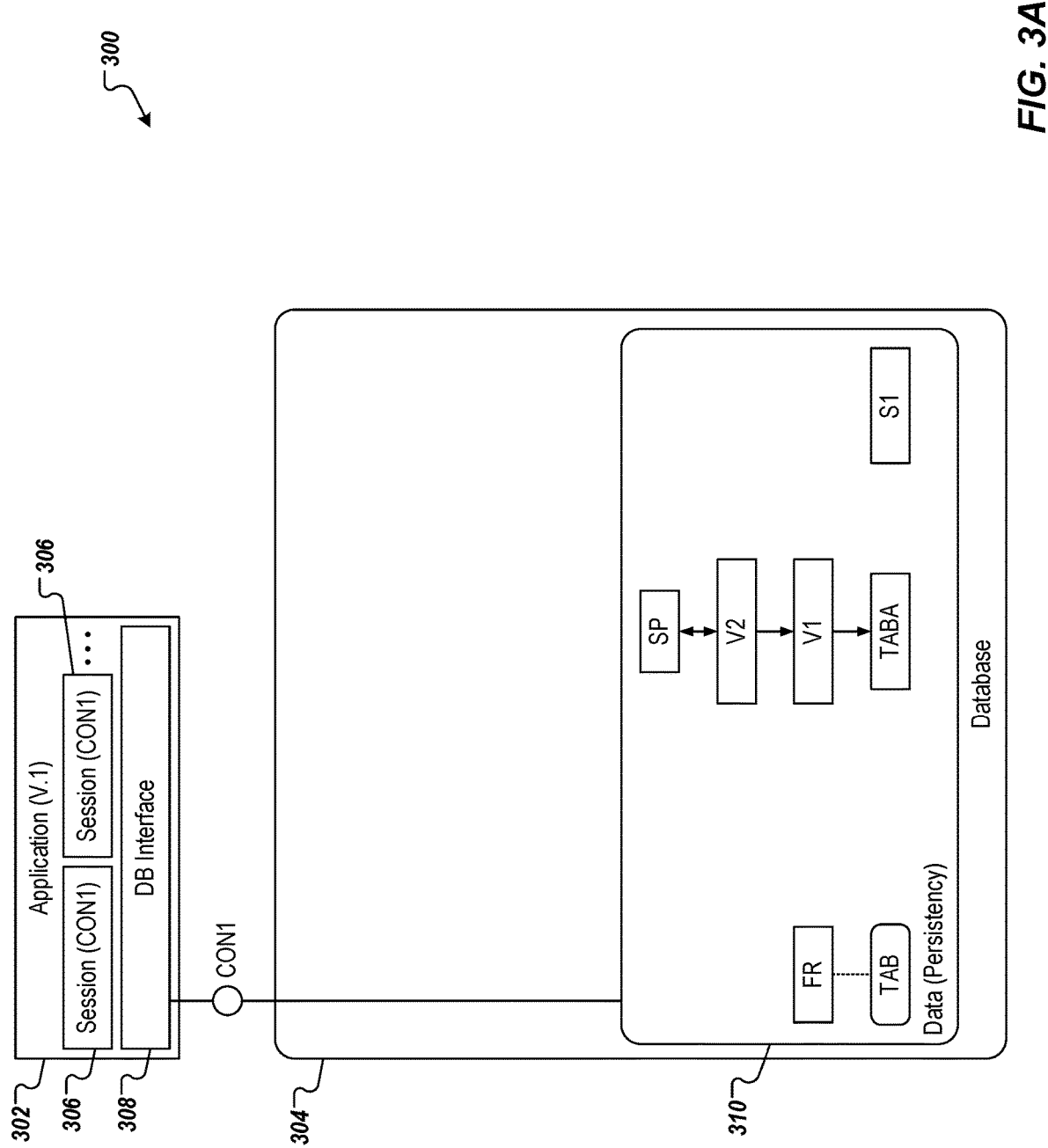
FIGS. 3A-3K depict a detailed progression for minimizing downtime during upgrade of an application in accordance with implementations of the present disclosure.

Implementations of the present disclosure are directed to minimizing downtime during upgrade of an application.

More particularly, implementations of the present disclosure are directed to using a view layer within a database system to minimize downtime during upgrade of an application from a first version to a second version. As described in further detail herein, implementations of the present disclosure deploy a view layer into a persistency of a database system without downtime to an application accessing the database system, such that the application can make productive use of the persistency during an upgrade. In some examples, the view layer provides an abstraction between persistency structure and application consumption and enables execution of persistency modification operations without downtime to the application. In the context of application version updates (e.g., updating an application from a first version to a second version), this can include application data migration and/or content deployment.

Implementations can include actions of providing a first access schema in a view layer of the database system, the first access schema including one or more first database objects and one or more projection views, each projection view corresponding to a second database object of one or more second database objects in a data persistency of the database system, transitioning access of sessions of an application from the data persistency of the database system to the first access schema, executing at least a portion of the maintenance procedure in the database system, the at least a portion of the maintenance procedure changing one or more second database objects within the data persistency, creating a second access schema, and transitioning access of the sessions of the application from the first access schema to the second access schema, transitioning access of the sessions of the application from the second access schema to the data persistency of the database system, and removing the second access schema from the database system.

To provide further context for implementations of the present disclosure, and as introduced above, during a lifecycle of an application and/or database, one or more maintenance operations may be required. Example maintenance operations include upgrading, patching, and testing. In order to perform such maintenance procedures, the application, and/or database may be taken offline, such that users are unable to interact with the application and/or database. This is referred to as downtime. Although software providers have strived to minimize downtime, achieving zero-downtime during such maintenance procedures can be difficult. An example goal for zero-downtime includes deploying an upgrade with a maximum read-only usage phase (e.g., maximum of 5 minutes).

In view of the above context, implementations of the present disclosure provide are directed to using a view layer within a database system to minimize downtime during upgrade of an application from a first version to a second version. As described in further detail herein, access to database objects is lifted from a data persistency to a view layer within the database system. An upgrade is performed, which can include structure changes to database objects (e.g., column insertion/deletion, column type change). During the upgrade, the application (first version) has unhindered access to the data persistency through the view layer. After the upgrade, the application (second version) has unhindered access to the data persistency through the view layer. Access to the data persistency is de-lifted from the view layer to the data persistency, and the view layer is removed.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In some implementations, one or more data stores of the server system 104 store one or more databases. In some examples, a database can be provided as an in-memory database. In some examples, an in-memory database is a database management system that uses main memory for data storage. In some examples, main memory includes random access memory (RAM) that communicates with one or more processors, e.g., central processing units (CPUs), over a memory bus. An-memory database can be contrasted with database management systems that employ a disk storage mechanism. In some examples, in-memory databases are faster than disk storage databases, because internal optimization algorithms can be simpler and execute fewer CPU instructions, e.g., require reduced CPU consumption. In some examples, accessing data in an in-memory database eliminates seek time when querying the data, which provides faster and more predictable performance than disk-storage databases.

Implementations of the present disclosure are described in further detail herein with reference to an example context. The example context includes enterprise applications that are executed on a client-server architecture, such as the example architecture 100 of FIG. 1. In some examples, enterprise applications can be provided in a suite that includes two or more enterprise applications. Example enterprise applications can include an enterprise resource planning (ERP) application, a customer relationship management (CRM) application, a supply chain management (SCM) application, and a product lifecycle management (PLM) application. It is contemplated, however, that implementations of the present disclosure can be realized in any appropriate context (e.g., healthcare applications).

Referring again to FIG. 1, and in the example context, one or more enterprise applications can be hosted by the server system 104. A user 110 can interact with an enterprise application using the client device 102. More specifically, a session can be established between the client device 102 and one or more server devices 104, during which session the user 110 is able to interact with one or more enterprise applications hosted on the server system 104. The one or more enterprise applications can enable the user to interact with data stored in one or more databases. In some examples, interactions can result in data being stored to the database, deleted from the database, and/or edited within the database.

In some implementations, applications and/or databases undergo lifecycle management. In some examples, lifecycle management includes executing one or more maintenance procedures for an application and/or a database. Example maintenance procedures can include an upgrade procedure, a patch procedure, a customer configuration procedure, and development and testing procedures. An example upgrade procedure can include updating software. For example, an application can be updated from a first version (e.g., V.1) to a second version (e.g., V.2). An example update can include adding functionality to the application. As another example, a database can be updated from a first version (e.g., V.1) to a second version (e.g., V.2). An example update can be updating a data schema of the database. In some examples, a data schema (also referred to as database schema) is a data structure that defines how data is to be stored in the database. In some examples, the database schema can be defined in a formal language that is supported by a database management system (DBMS), and can include a set of formulas (also referred to as constraints) imposed on the database. In general, a data schema can be described as a catalog that specifies all database objects that can be stored in the database. In some examples, different data schemas (e.g., V.1 versus V.2) can have different objects with the same object name, but different structures.

As introduced above, the execution of maintenance procedures traditionally results in downtime (e.g., unavailability) of an application and/or a database. Implementations of the present disclosure enable zero downtime of the application and/or database during maintenance procedures. That is, implementations of the present disclosure provide continuous availability of an application and/or data during one or more maintenance procedures. In some examples, maintenance procedures include one or more of an upgrade of the application (e.g., V.1→V.2), application data migration, and content deployment. Implementations of the present disclosure are particularly directed to scenarios, in which maintenance procedures include changes to code artifacts (e.g., views, procedures, triggers, table functions) stored in the database, changes to structures (e.g., add/remove column(s), change column type(s)) of one or more tables stored in the database, deployment of content (e.g., repository content, customization content) to one or more tables stored in the database, and/or migration of application data (e.g., generic data migration, migration using application-specific code).

Implementations of the present disclosure enable continued access of an application to data objects within a data persistency of a database system using a view layer. As described in further detail herein, access to database objects is lifted from the data persistency to the view layer within the database system. An upgrade is performed, during which, the application (first version) has unhindered access to the data persistency through the view layer. After the upgrade, the application (second version) has unhindered access to the data persistency through the view layer. Access to the data persistency is de-lifted from the view layer to the data persistency, and the view layer is removed.

FIGS. 2A-2E depict an overview progression for minimizing downtime during upgrade of an application in accordance with implementations of the present disclosure. FIG. 2A depicts a system 202 that includes an application server 204 and a database system 206. The application server 204 hosts an application 208 that is of a first version (V.1). The database system 206 stores data in a data persistency 210 (also referred to as data schema). During operation, the application 208 accesses data stored in the data persistency 210. For example, the application 208 can perform one or more operations (e.g., read, write) on data objects (e.g., tables, views) stored in the data persistency. In the example of FIG. 2A, access to data objects is in the data persistency 206 itself. That is, there is no intermediate layer between the application 208 and the data persistency 206.

A maintenance procedure is to be performed on the application 208. For example, the application 208 is to be upgraded from the first version to a second version (V.2). In accordance with implementations of the present disclosure, and as described in further detail herein, prior to the maintenance procedure being executed, or as an initial phase of a maintenance process, a view layer is deployed in the database system 206. The view layer enables modifications to be implemented in the data persistency 210 without impact to execution of the application 208. That is, the view layer enables execution of modifications to the data persistency 210 during the maintenance procedure without the application 208 experiencing downtime (i.e., the application 208 is able to access data in the database system 206 during execution of the maintenance procedure).

In further detail, and with reference to FIG. 2B, an access schema B 212 is created within the database system 206. The access schema B 212 is a component of the view layer of the present disclosure. As described in further detail herein, the access schema B 212 is provided as part of a so-called lift process to lift access to data in the data persistency 210 from the data persistency 210 and to the access schema B 212. That is, access to data objects within the data persistency 210 is lifted from the data persistency 210 to the access schema 212. For example, and depending on the data that is stored in the data persistency 210, the access schema B 212 includes one or more of projection views and sequences that enable the application 208 to continuously access data in the data persistency 210 during execution of a maintenance procedure through the access schema B 212.

After the access schema B 212 has been provided and the application 208 has been connected to the access schema B 212 to access data in the data persistency 210, the maintenance procedure operations that impact the data persistency 210 can be executed (e.g., column insertion/deletion, column type change). In some examples, the maintenance procedure operations are executed as part of a so-called blue-green deployment.

The name blue-green deployment is derived from analogy to mechanisms used for runtime blue-green deployments. In runtime blue-green deployments, a new (green) runtime is deployed in parallel to a current (blue) runtime. After deployment, users are re-directed to the green runtime, and the blue runtime is stopped. In the context of implementations of the present disclosure, a current access schema (e.g., an access schema that a first version of an application uses to access data in the database system) is referred to as a blue access schema and a new access schema (e.g., an access schema that a second version of the application uses to access data in the database system) is referred to as a green access schema. More particularly, during a blue-green deployment of a maintenance procedure, a new access schema (green) is provided for the target version (e.g., V.2) of an application in parallel with the current access schema (blue) used by the source version (e.g., V.1, also referred to as source, and/or production) of the application. Accordingly, during the deployment (upgrade), there are multiple access schemas existing at the same time (e.g., blue, and green), here, the adjectives blue and green being used to distinguish between the multiple access schemas. It is contemplated, however, that any appropriate adjectives (e.g., first, second) can be used to distinguish multiple access schemas that co-exist and implementations of the present disclosure are not limited to blue and green.

Maintenance procedures deployed using multiple access schemas are described in further detail in commonly assigned U.S. Pat. No. 10,303,665 and U.S. 2020/0159852, which are expressly incorporated herein by reference in their entireties for all purposes.

With particular reference to FIG. 2C, an access schema G 220 is provided in the database system 206 and an application 208' of the second version (V.2) is deployed in the application server 204. During an upgrade of the application 208 (V.1) to the application 208' (V.2), the application 208 can continue to access data stored in the data persistency 210 through the access schema B 212. Here, and in terms of blue-green deployment, the access schema B 212 is considered as the blue (B) access schema. After upgrade of the application 208 (V.1) to the application 208' (V.2), the application 208' can access data stored in the data persistency 210 through the access schema G 220. Here, and in terms of blue-green deployment, the access schema G 220 is considered as the green (G) access schema. FIG. 2D depicts the system 202 after the maintenance procedure has been completed and the application 208' has taken over production use from the application 208. Here, the access schema 212 of FIGS. 2B and 2C has been removed, and the application 208' accesses data in the data persistency 210 through the access schema G 220.

In accordance with implementations of the present disclosure, and as described in further detail herein, after the maintenance procedure is executed or as an ending phase of the maintenance procedure, the view layer is removed from the database system 206. More particularly, the application 208' is directly connected to the data persistency 210 and the access schema G 220 is removed as part of a so-called de-lift process to change access to data in the data persistency 210 from the access schema B 212 to the data persistency 210. FIG. 2E depicts the system 202 after the de-lift process has been executed.

As described in further detail herein, the lift process of the present disclosure includes sorting database objects within the data persistency between database objects that are to remain in the data persistency during the maintenance procedure and database objects that are to be lifted to a first access schema in the view layer. More particularly, database objects holding content remain in the data persistency. In some examples, content includes data that is stored in the database objects and can be accessed by an application (e.g., insert, update, read). That is, content includes data that one or more operations can be executed on. Such database objects can include, for example and without limitation, tables, indexes, and sequences. For each table, a projection view is created in the first access schema and, for each sequence, if any, a synonym is created in the access schema. A sequence can be described as a database object that holds a value and logic, the value being selectively increased based on the logic (e.g., the logic is specified with a create statement of the sequence). In some examples, sequences are used to create increasing numbers within a database in a transactionally consistent system used by many users. In some examples, a synonym creates a database object with a new name and a reference to another database object. The other database object can be accessed with the name of the synonym.

In some examples, the projection view and synonym have the same name as the table or sequence, respectively. In this manner, database objects remaining in the data persistency are exposed to the first access schema. For example, tables are exposed using respective projection views, each projection view enabling creation of database objects on the projection view that can be created on a table in the data persistency. This can include, for example and without limitation, a database trigger. Each projection view also enables execution of statements (e.g., truncate table) on the projection view and the statement acts on the table. Each projection view also enables executing run a "select for update" on the projection view. More particularly, a projection view enables execution of operations typically done on tables accessed directly in the data persistency. Example operations include, without limitation:

Cerate triggers (insert, update, delete) on projection views.
TRUNCATE TABLE <table>
MERGE DELTA OF <table>
LOAD <table>
UNLOAD <table>
LOCK TABLE <table>

Any remaining database objects are created in the first access schema. These can include, for example and without limitation, views, stored procedures, database triggers, search rules, replication tasks, flow graphs, virtual tables, calculation views, and other database objects not holding content. In some examples, the objects are created through execution of respective create statements.

After the first access schema is in place, the application (V.1) is triggered to re-connect user sessions to the first access schema. User sessions are each re-connected at point at which a re-connect is possible without data loss or disruption to the application (e.g., database commit, or similar event). Database objects not holding content (e.g., views, database triggers, stored procedures) are deleted from the data persistency. At this point, projection views in the first access schema enable modification of tables in structure and/or content without impact to users of the tables. Consequently, a maintenance procedure that includes modifications to tables can be executed without the application experiencing downtime.

Implementations of the present disclosure also enable lock-free operations to be executed. That is, operations on database objects can be executed without requesting an exclusive lock. Example operations include, without limitation:

ALTER TABLE <tablename> ADD (<columndefinition> [,<columnname>]) ONLINE [PREFERRED]
ALTER TABLE <tablename> DROP (<columnname> [,<columnname>]) ONLINE [PREFERRED]
CREATE TRIGGER . . . ONLINE <trigger_body>
DROP TRIGGER <triggername> ONLINE
CREATE [ . . . ] INDEX <index name> ON <table_name> . . . [ONLINE]
DROP INDEX <index name> [ONLINE [PREFERRED]]

In the above examples, the key word PREFERRED indicates that the operation should be executed ONLINE, if possible. If, however, the operation cannot be performed ONLINE, it will be executed in the classic way with EXCLUSIVE lock. In these examples, ONLINE is used to create the respective object without an exclusive lock in parallel to transactions writing to the object. With an exclusive lock, the transactions need to be complete, no new transactions are started, the object is changed, and new transactions can start. This can cause disruption to consumption, if many users are working with the object and many transactions are executed. In short, ONLINE means without impacting running transactions or delaying new transactions.

As described in further detail, the maintenance procedure results in a second access schema being provided in the view layer, which enables the application (V.2) to access data objects in the data persistency. In some examples, objects are created in the second access schema in view of the target version (e.g., V.2) that is to result from the maintenance procedure. That is, the objects in the second access schema represent the to-be-modified structure of database objects through the impending maintenance procedure.

In further detail, because access to database objects within the data persistency is executed through projection views (or synonyms), certain changes to the database objects in the data persistency are possible without impacting use of the data persistency. Example changes include, without limitation, structure changes, field type changes, and content changes.

For example, the structure of a table can be changed such that a column can be added and/or deleted. In adding a column, the projection view of the first access schema cannot select the column, the content is thus not visible in the first access schema. The projection view of the second access schema can select the column, the content is thus visible in the second access column. In deleting a column, the projection view of the second access schema does not have the column, the application operation is thus not getting this content. After the switch over to the target version (V.2), the column can be dropped in the data persistency.

With regard to changes in field type, to change the type of a column, a new column with a different name is added. For example, for a column with column name B, a new column with column name B #1 can be added. The content of the old column is copied and is migrated to the new type in the new column. A trigger-based replication of inserted and updated rows ensures that all changes are up-to-date (the replication is done within the transaction, not asynchronously). The projection view of the second access schema selects the new column in the table having a different name, but exposes it with the original name to the consumers (e.g., select B #1 as B from TAB). After the users are switched to the second version (V.2), the old column (e.g., B) is dropped from the table within the data persistency.

With regard to change of content, if the content of a table is to be modified during the maintenance procedure, a new table is created with a different name. For example, for a table TAB, a new table TAB #1 can be created. The projection view in second access schema selects from the new table, but has the original name and exposes the new table under the name required by the application. This is required if content in a table is to be migrated (e.g., an application-specific operation to modify the content), or if content is delivered by the software vendor, and the content is not to be visible to the application (V.1) to not disrupt operation. In some examples, data is incrementally replicated incrementally to the new table. After switch of the users to the application (V.2), the old table (e.g., TAB) is dropped, the new table is kept (e.g., TAB #1).

During a de-lift process, tables having table names that differ from projection views are changed (e.g., TAB #1 is changed to TAB). Such differences can occur as part of the maintenance procedure, as discussed above with respect to content change. Projection views are adjusted to direct to the table with the same name as the projection view after renaming. A possible error (SQL error) that can occur during this operation is caught by the database interface and the erroneous operation is re-executed. Database objects of the second access schema are created in the data persistency. These include, for example and without limitation, views, stored procedures, database triggers, and other objects not holding content. The application (V.2) is triggered to re-connect user sessions to the data persistency. User sessions are each re-connected at point at which a re-connect is possible without data loss or disruption to the application (e.g., database commit, or similar event). The second access schema (including the database objects contained therein) is deleted.

FIGS. 3A-3J depict a detailed progression for minimizing downtime during upgrade of an application in accordance with implementations of the present disclosure.

FIG. 3A depicts a system 300 in production use prior to initiating a maintenance procedure. In the example of FIG. 3A, the system 300 includes an application 302 of a first version (V.1) and a database system 304. In some examples, the application 302 is hosted by an application server and supports multiple sessions 306 that connect with the database system 304 through a database (DB) interface 308. In the example of FIG. 3A, the database system 304 includes a data persistency 310 (also referred to as data schema) that stores database objects. A first database connection (CON1) is configured in the database interface 308 of the application 302, the first database connection (CON1) being directed to the data persistency 310. In this manner, the sessions 306 of the application 302 communicate with data persistency 310 to access data objects stored therein. In the depicted example, example database objects include a first table (TAB) having a filter rule (FR) applied thereto, a second table (TABA), a first view (V1), a second view (V2), a stored procedure (SP), and a database sequence (S1). Prior to initiating a maintenance procedure, the database interface 308 enables each of the sessions 306 to access data within the data persistency 310.

A maintenance procedure is to be performed on the application 302. For example, the application 302 is to be upgraded from the first version (V.1) to a second version (V.2). In accordance with implementations of the present disclosure, and as described in further detail herein, prior to the maintenance procedure being executed or as an initial phase of a maintenance process, a view layer is deployed in the database system 304. The view layer enables modifications to be implemented in the data persistency 310 without impact to execution of the application 302. That is, the view layer enables execution of modifications to the data persistency 310 during the maintenance procedure without the application 302 experiencing downtime (i.e., the application 302 is able to access data in the database system 304 during execution of the maintenance procedure).

Figure 3B:
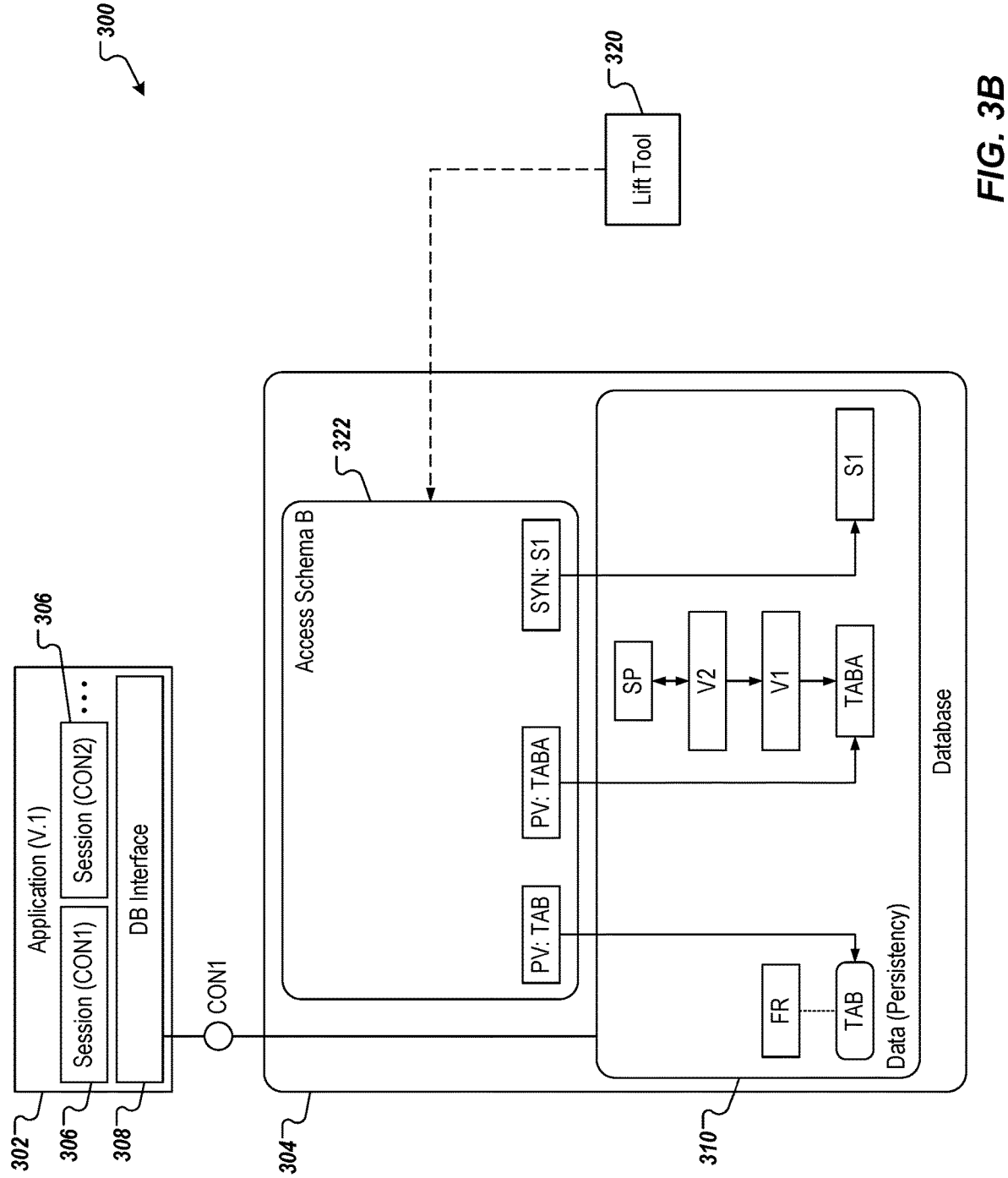

In further detail, and with reference to FIG. 3B, an access schema B 322 (blue access schema) is created within the database system 304. The access schema B 322 is a component of the view layer of the present disclosure. As described in further detail herein, the access schema B 322 is provided as part of a so-called lift process that is executed by a lift tool 320 to lift access to data in the data persistency 310 from the data persistency 310 and to the access schema B 322. In some examples, the lift tool 320 is provided as one or more computer-executable programs that are configured to, among other operations, create access schemas within the database system 304, remove access schemas from the database system 304, create connections between the database interface 308 and the database system 304, and remove connections between the database interface 308 and the database system 304.

The lift tool 320 creates the access schema B 322 to include, for each table in the data persistency 310, a projection view (PV) and, for each database sequence in the data persistency 310, a synonym (SYN). More generally, for each database object that includes content, the lift tool 320 creates a corresponding projection view in the access schema B 322. In the example of FIG. 3B, the access schema B 322 includes a first projection view (PV: TAB) for the first table, a second projection view (PV: TABA) for the second table, and a synonym (SYN: S1) for the database sequence. In further detail, the lift tool 320 identifies all tables in the data schema by, for example, selecting the tables from the database catalog or the application data dictionary. For each table, the lift tool 320 creates a projection view (e.g., create projection view BLUE.TAB as select <field-list> from DATA.TAB). The lift tool 320 identifies all sequences in the data schema by, for example, selecting the sequences from the database catalog or the application data dictionary. For each sequence, the lift tool 320 creates a synonym (e.g., create synonym BLUE.S1 on DATA.S1).

Figure 3C:
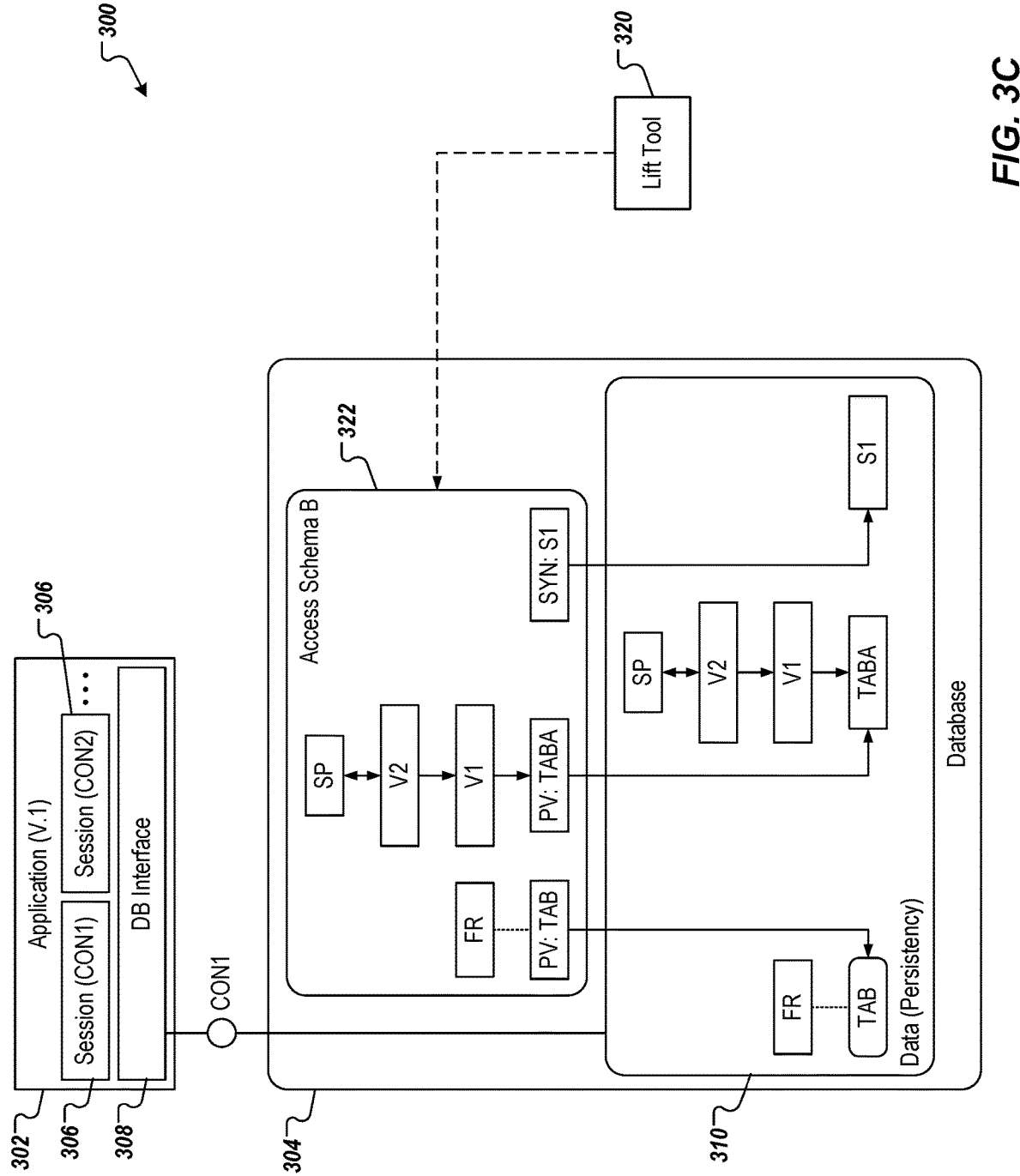

With reference to FIG. 3C, the lift tool 320 computes sequences to create views in the sequence-defined orders within the access schema B 322, creates stored procedures within the access schema B 322, and creates other data objects (e.g., filter rules, dependency rules) within the access schema B 322. In further detail, the lift tool 320 identifies all views (e.g., SQL views) within the data persistency 310 by, for example, selecting view objects from the application data dictionary. The lift tool 320 creates sequences of views, as appropriate, within the access schema B 322. For example, and as depicted in the example of FIGS. 3A-3J, the second view (V2) selects from the first view (V1). Consequently, the first view (V1) is created before the second view (V2). The lift tool 320 creates the views in the access schema B 322 selecting from projection views and views. In the example of FIG. 3C, the lift tool 320 creates the first view (V1) from the second projection view (PV: TABA) and creates the second view (V2) from the first view (V1).

The lift tool 320 identifies all stored procedures in the data persistency 310 by, for example, selecting the stored procedure objects from the database catalog or the application data dictionary, and creates the stored procedures in the access schema B 322. The lift tool 320 creates other database objects that are present in the data persistency 310 within the access schema B 322. In the example of FIG. 3C, the lift tool 320 creates the filter rule (FR) in the access schema B 322. More generally, and as described herein, the lift tool 320 creates objects of the data persistency 310 that do not contain content.

Figure 3D:
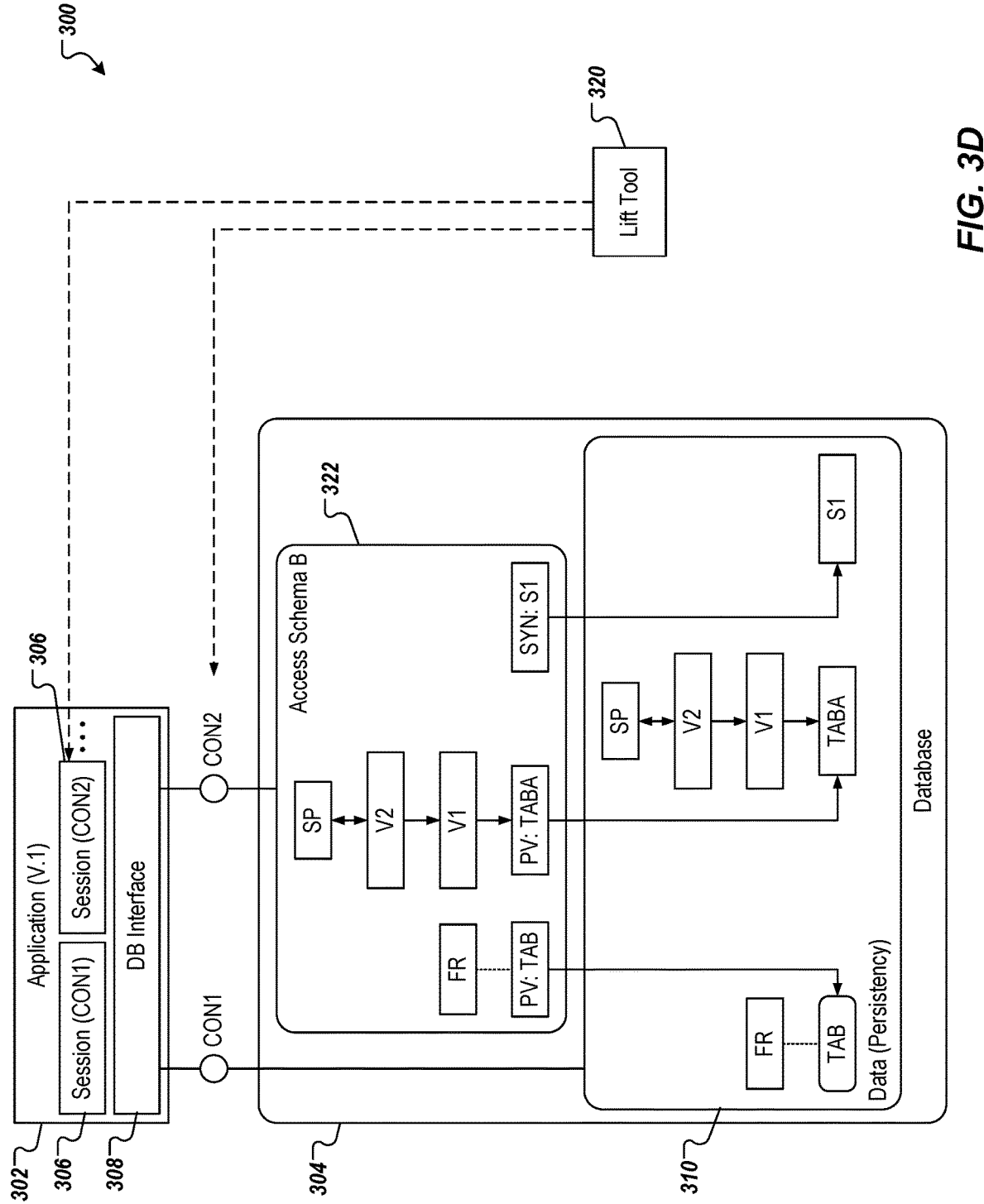

With reference to FIG. 3D, connections to the database system 304 are reconfigured. In the example of FIG. 3D, the lift tool 320 configures a second database connection (CON2) in the database interface 308 of the application 302, the second database connection (CON2) being directed to the access schema B 322. The lift tool 320 triggers the application server that executes the application 302 to roll the sessions 306 to the second database connection (CON2). In some examples, the sessions 306 are asynchronously rolled to the second database connection (CON2). For example, after a roll event is executed by a session 306, the session 306 is switched to the second database connection (CON2). Example roll events can include, without limitation, database commit, screen change closing-open cursors, and the like. In some examples, a grace period is provided, within which a roll event triggers the switch. If a roll event does not occur for a session 306 within the grace period, the session 306 is automatically switched to the second database connection (CON2).

Figure 3E:
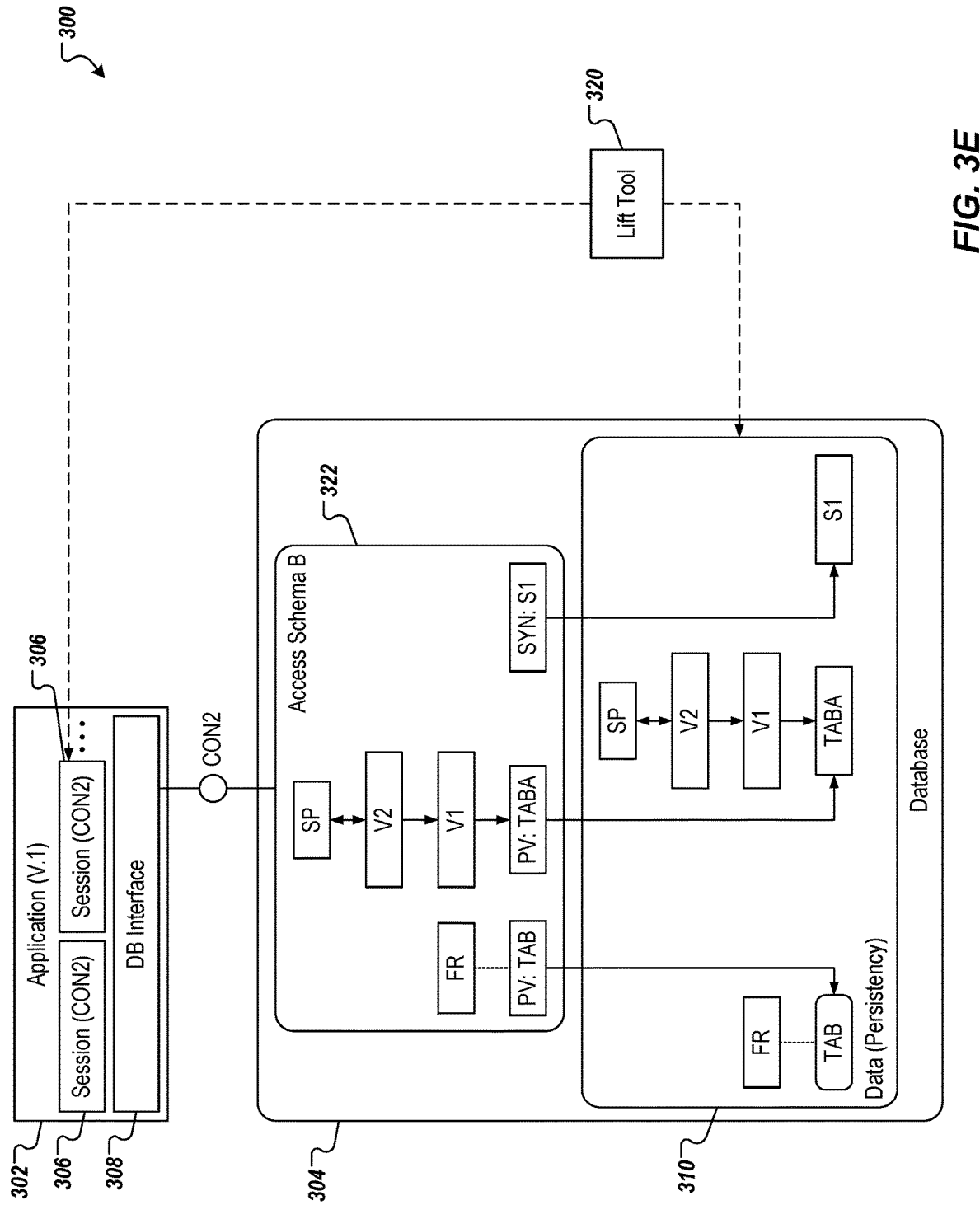

Eventually, all of the sessions 306 access data objects within the data persistency 310 through the second database connection (CON2) and the access schema B 322, and the first database connection (CON1) is deleted, as depicted in FIG. 3E.

Figure 3F:
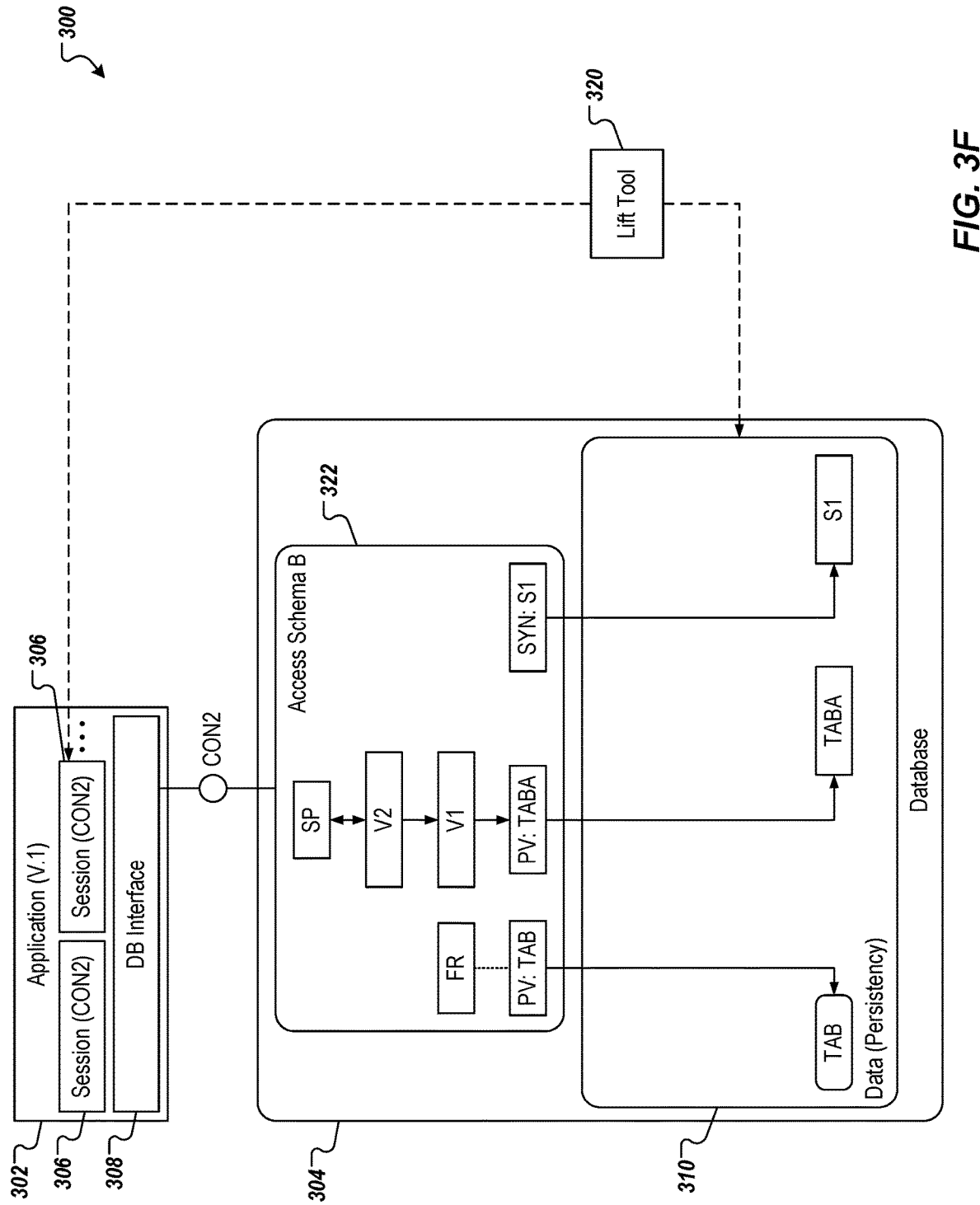

With reference to FIG. 3F, the lift tool 320 deletes the data objects within the data persistency 310, which had been created in the access schema B 322. In the depicted example, the filter rule (FR), the first view (V1), the second view (V2), and the stored procedure (SP) are deleted from the data persistency 310.

Figure 3G:
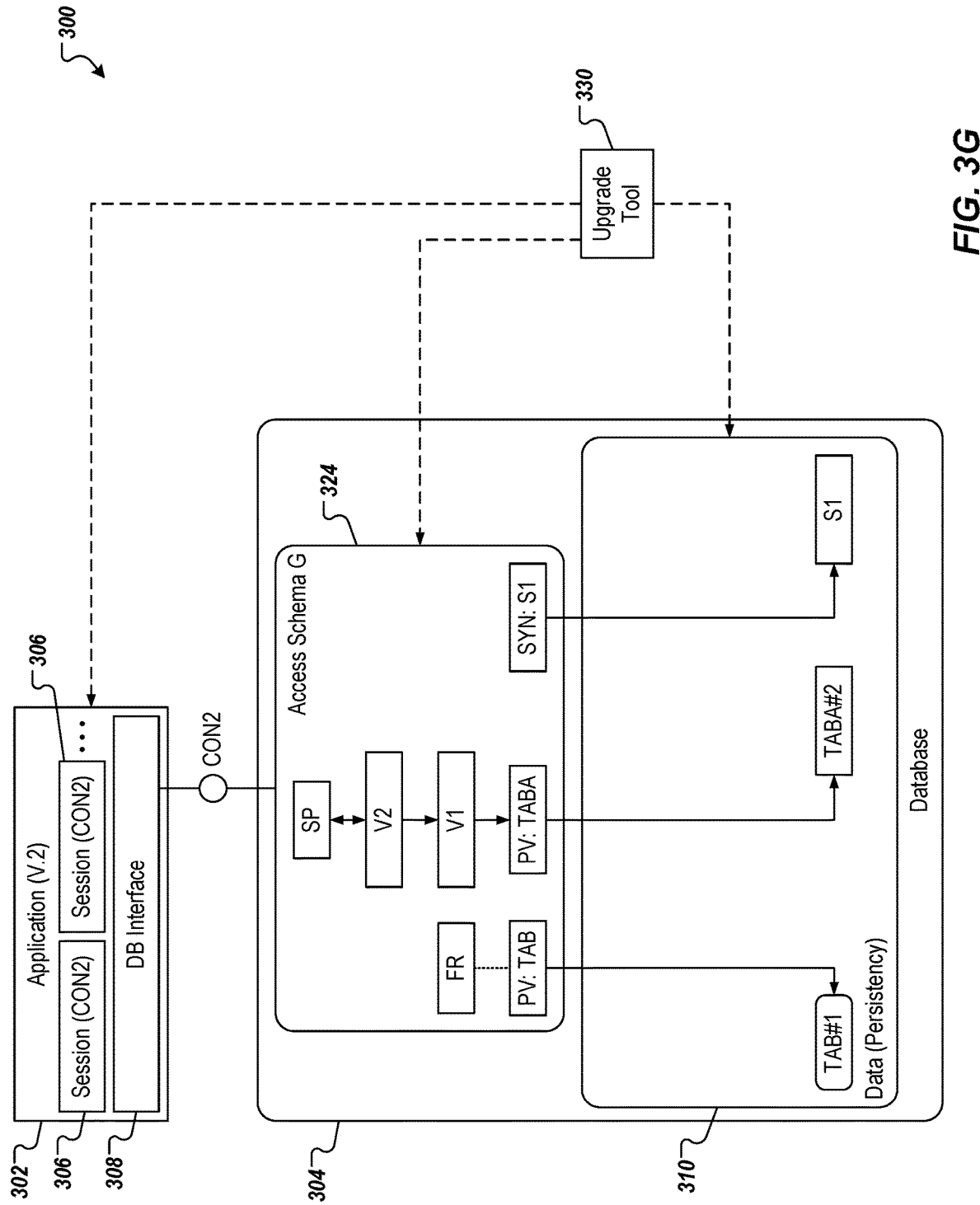
Figure 3H:
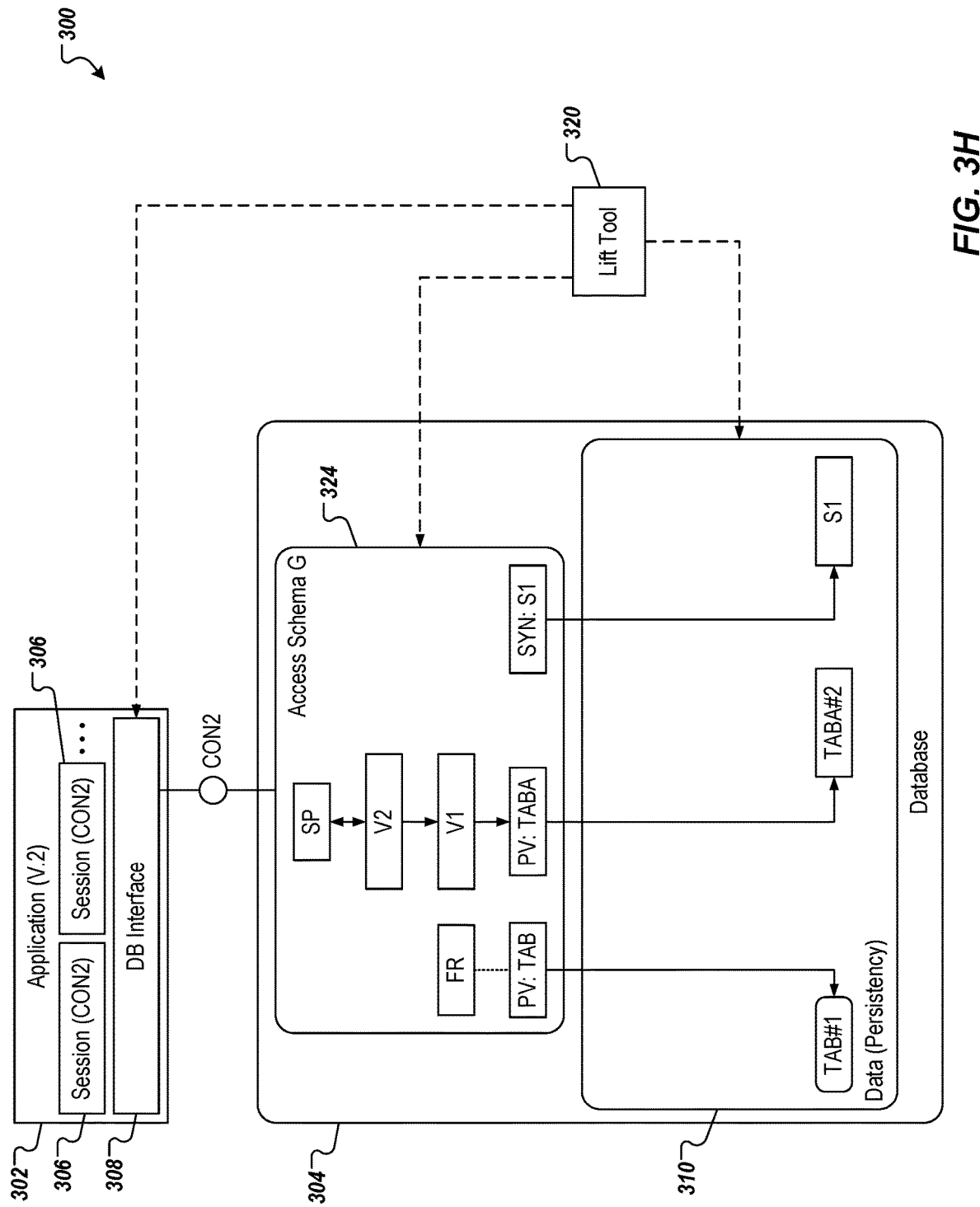

The maintenance procedure is executed to make changes to data objects within the data persistency 310 based on the transition of the application 302 from the first version (V.1) to a second version (V.2). For example, the second version (V.2) can include changes to tables (e.g., column insert/delete, column type changes, content changes). In the example of FIG. 3G, an upgrade tool 330 executes at least a portion of the maintenance procedure, which includes changes to, in the depicted example, the first table and the second table. Consequently, the first table undergoes a name change from TAB to TAB #1 and the second table undergoes a name change from TABA to TABA #1. In some examples, the lift tool 320 and the upgrade tool 330 are the same (e.g., upgrade functionality is coded into the lift tool or vice-versa). During the maintenance procedure, the upgrade tool 320 creates an access schema 324, such that, at the completion of the maintenance procedure, the application 302 is transitioned to the second version (V.2) and sessions 306 access the data persistency through the access schema G 324. This is depicted in FIG. 3G.

With reference to FIGS. 3H-3K, a de-lift process is executed to enable the sessions 306 to directly access the data persistency and remove the access schema G 324. For example, and with reference to FIG. 3H, the lift tool 320 configures error codes to switch on "retry after error." In this manner, if a session 306 tries to access a table having a changed table name, an error is caught and access is re-tried after a period of time, which enables table names to be transitioned, as described in further detail herein. For example, and as discussed above, the second table TAB had a name change to TAB #2, but the projection view in the access schema G 324 points to the old table name TABA. Consequently, an attempt to access the second table will result in an error until the name of the second table is changed back to TABA. For example, the following example error can result:

error 1091
ERR_DATA_STAT_TABLE_NOT_FOUND
specified table not found or not supported The lift tool 320 configures the database interface 308 to catch the error and re-attempt the access after a time period (e.g., 10 ms). In this manner, the session 306 is unaware of the error. This can loop a threshold number of tries (e.g., 10 tries) before signaling an error to the session 306. In this manner, time is afforded to rename tables.

Figure 3I:
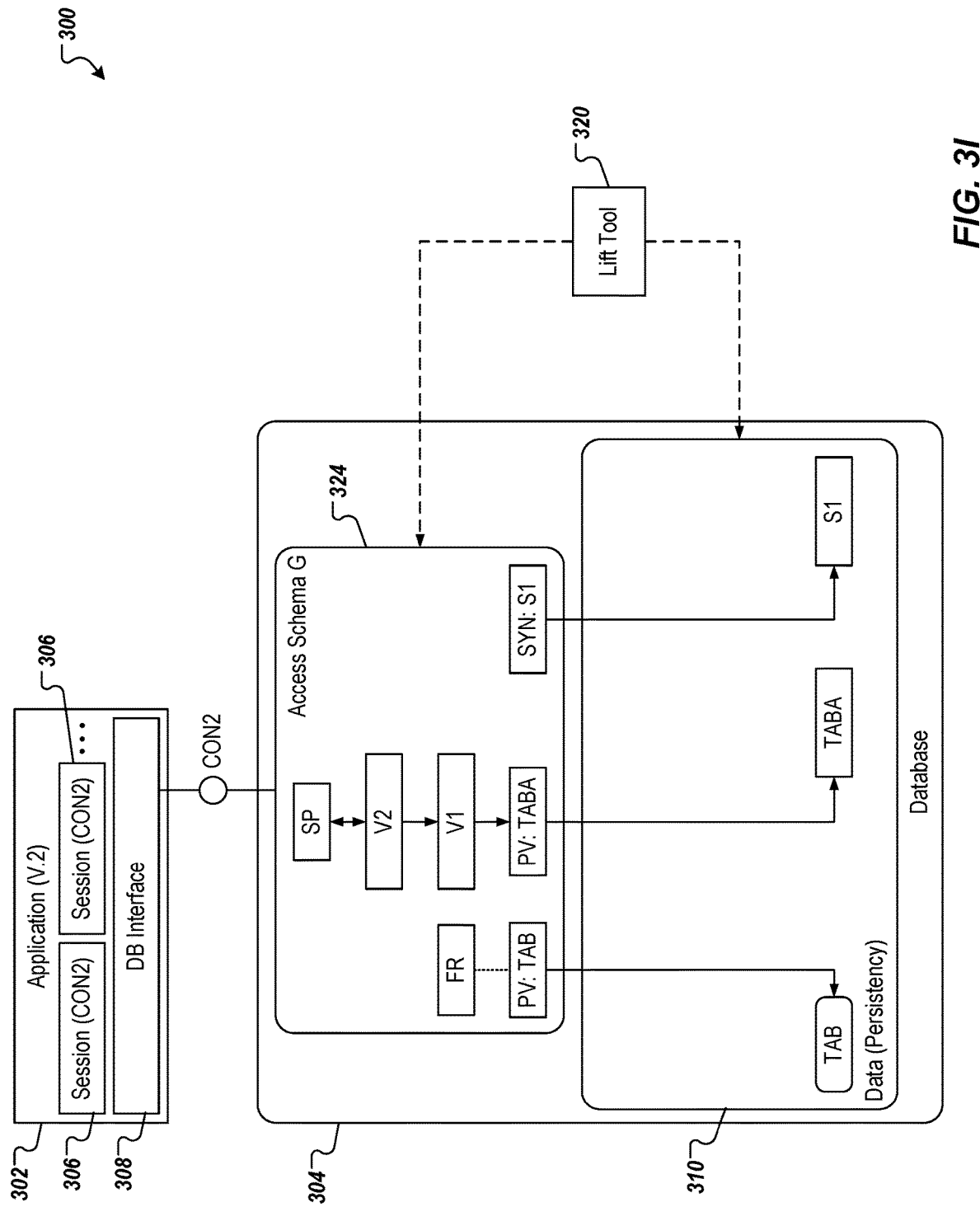

In further detail, the lift tool 320 determines the tables and/or columns that need to be renamed based on name changes that occurred during the maintenance procedure. The lift tool 320 iterates over the tables and/or columns to change the names to the expected names (e.g., the names before the maintenance procedure was executed). FIG. 3I depicts the system 300 after the name changes have been executed.

With continued reference to FIG. 3I, the lift tool 320 determines database objects that are to be created in the data persistency 310. For example, the lift tool 320 inventories the database objects of the access schema G 324 to create these database objects in the data persistency 310. Here, the projection views are not included as database objects that are to be created in the data persistency. The lift tool 320 creates the database objects in the data persistency 310, as depicted in FIG. 3J.

Figure 3J:
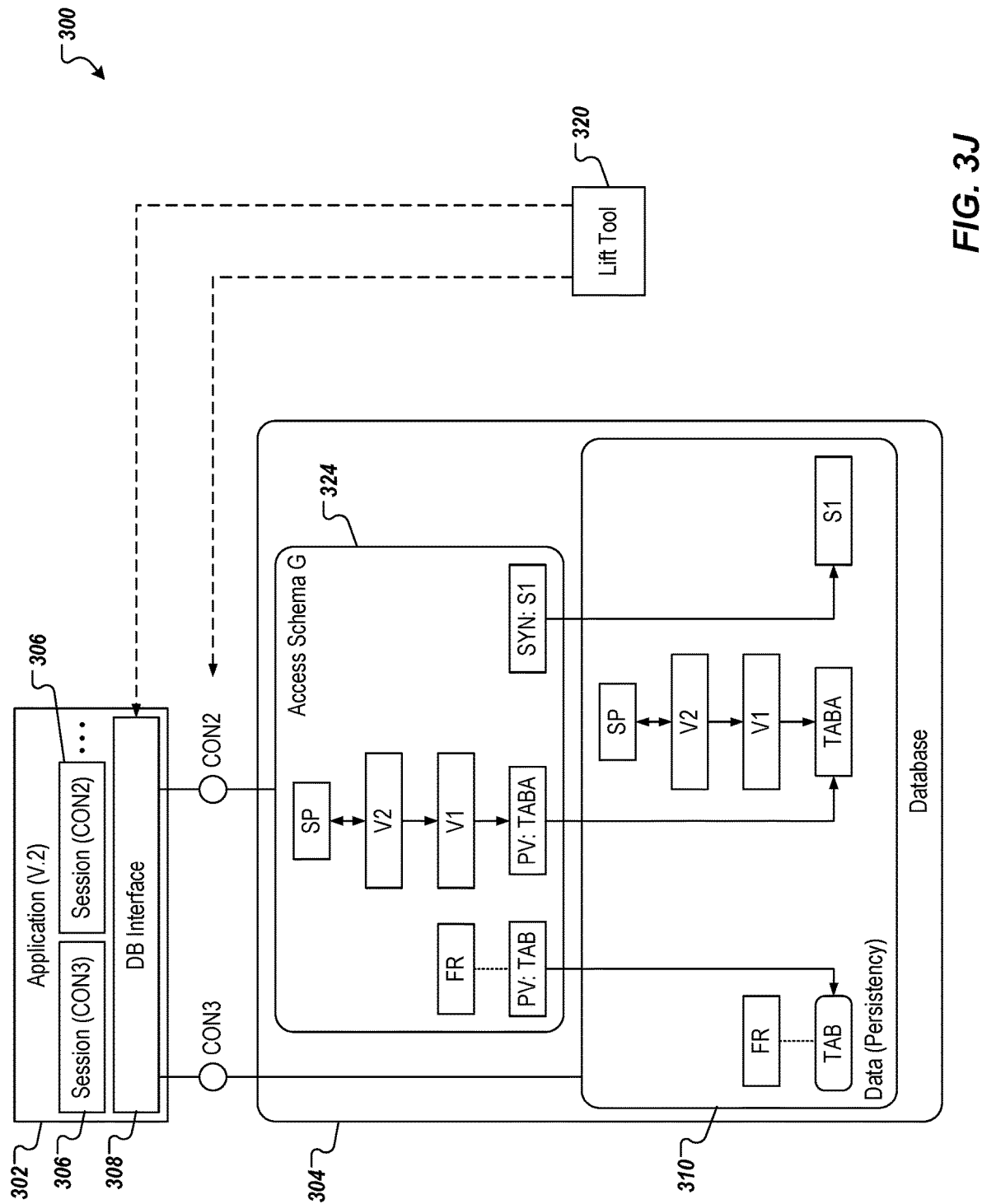

With continued reference to FIG. 3J, the lift tool 320 configures a third database connection (CON1) in the database interface 308, the third database connection (CON3) directing to the data persistency 310. The lift tool 320 triggers the application server to roll the sessions from the second database connection (CON2) to the third database connection (CON3). In some examples, the sessions 306 are asynchronously rolled to the third database connection (CON3). For example, after a roll event is executed by a session 306, the session 306 is switched to the third database connection (CON3). Example roll events can include, without limitation, database commit, screen change closing-open cursors, and the like. In some examples, a grace period is provided, within which a roll event triggers the switch. If a roll event does not occur for a session 306 within the grace period, the session 306 is automatically switched to the third database connection (CON3). This process is depicted in FIG. 3J.

Figure 3K:
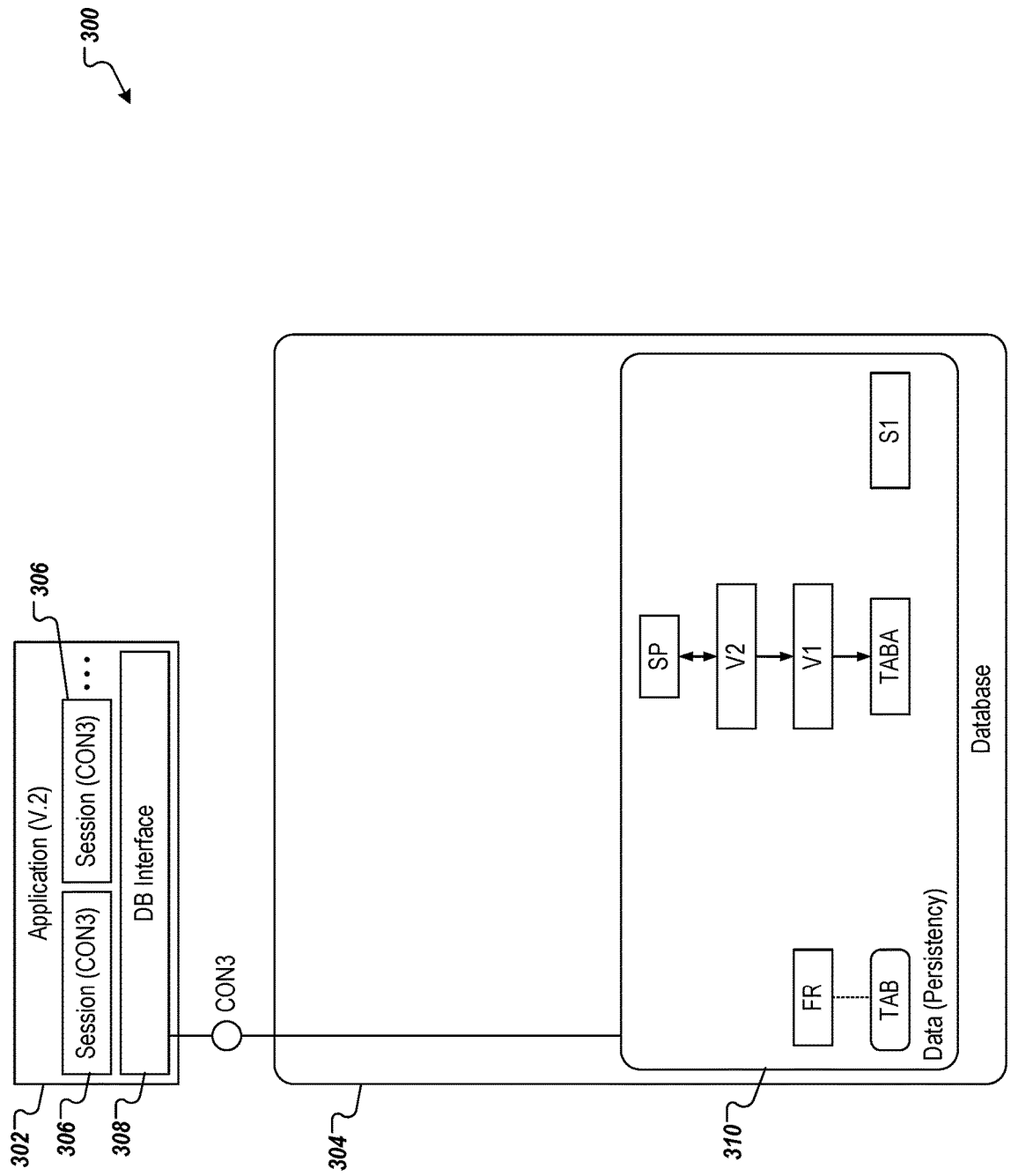

After all sessions 306 are rolled to the third database connection (CON3), the access schema 324 is removed, as depicted in FIG. 3K. At this point, all of the sessions 306 directly access the data persistency 310.

Figure 4:
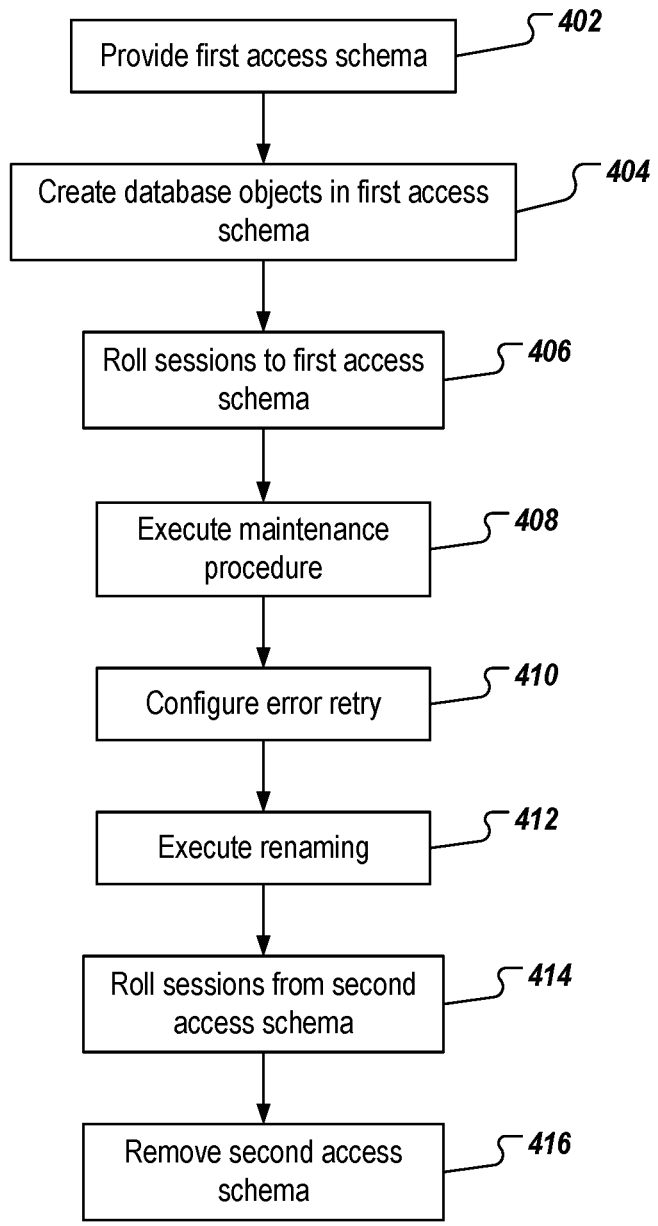
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices.

A first access schema is provided (402). For example, and as described in detail herein, with reference to FIGS. 3A-3K, an access schema B 322 (blue access schema) is created within the database system 304. The lift tool 320 creates the access schema B 322 to include, for each table in the data persistency 310, a projection view (PV) and, for each database sequence in the data persistency 310, a synonym (SYN). Database objects are created in the first access schema (404). For example, and as described in detail herein, the lift tool 320 identifies all stored procedures in the data persistency 310 by, for example, selecting the stored procedure objects from the database catalog or the application data dictionary, and creates the stored procedures in the access schema B 322. The lift tool 320 creates other database objects that are present in the data persistency 310 within the access schema B 322.

Sessions are rolled to the first access schema (406). For example, and as described in detail herein, connections to the database system 304 are reconfigured. In the example of FIG. 3D, the lift tool 320 configures a second database connection (CON2) in the database interface 308 of the application 302, the second database connection (CON2) being directed to the access schema B 322. The lift tool 320 triggers the application server that executes the application 302 to roll the sessions 306 to the second database connection (CON2).

A maintenance procedure is executed (408). For example, and as described in detail herein, the maintenance procedure is executed to make changes to data objects within the data persistency 310 based on the transition of the application 302 from the first version (V.1) to a second version (V.2). For example, the second version (V.2) can include changes to tables (e.g., column insert/delete, column type changes, content changes).

One or more error retries are configured (410). For example, and as described in detail herein, a de-lift process is executed to enable the sessions 306 to directly access the data persistency and remove the access schema G 324. For example, and with reference to FIG. 3H, the lift tool 320 configures error codes to switch on "retry after error." In this manner, if a session 306 tries to access a table having a changed table name, an error is caught and access is re-tried after a period of time, which enables table names to be transitioned.

Renaming is executed (412). For example, and as described in detail herein, the lift tool 320 determines the tables and/or columns that need to be renamed based on name changes that occurred during the maintenance procedure. The lift tool 320 iterates over the tables and/or columns to change the names to the expected names (e.g., the names before the maintenance procedure was executed).

Sessions are rolled from the second access schema (414). For example, and as described in detail herein, the lift tool 320 configures a third database connection (CON1) in the database interface 308, the third database connection (CON3) directing to the data persistency 310. The lift tool 320 triggers the application server to roll the sessions from the second database connection (CON2) to the third database connection (CON3). In some examples, the sessions 306 are asynchronously rolled to the third database connection (CON3). The second access schema is removed (416). For example, and as described in detail herein, after all sessions 306 are rolled to the third database connection (CON3), the access schema 324 is removed, as depicted in FIG. 3K. At this point, all of the sessions 306 directly access the data persistency 310.

Figure 5:
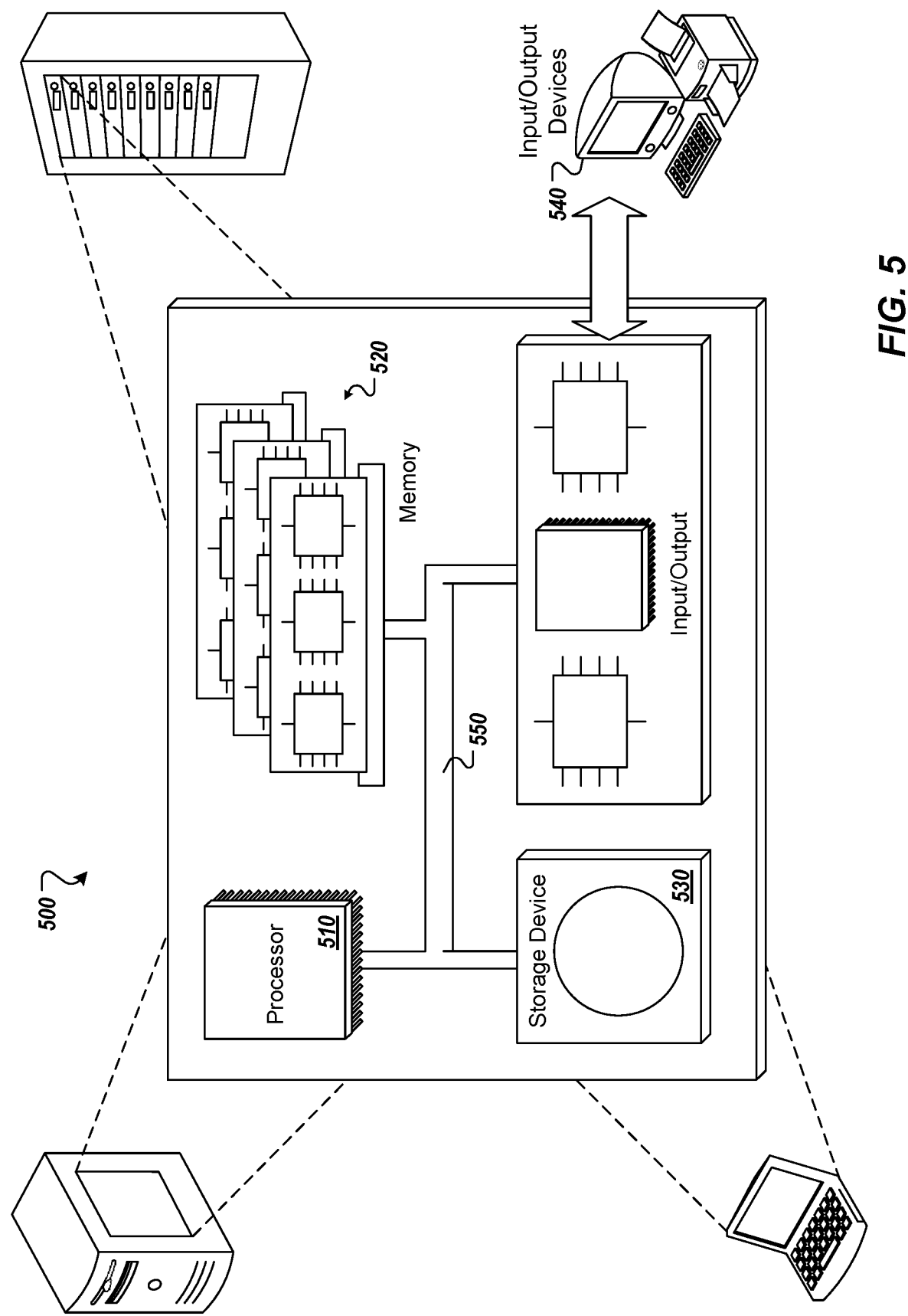
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for minimizing downtime during execution of a maintenance procedure of a database system, the method being executed by one or more processors and comprising:
   providing direct access by an application to a data persistency without passing through any view layer between sessions of the application and the data persistency within a database system;
   adding a view layer in the database system as an intermediate layer between the application and the data persistency within the database system;
   providing a first access schema in the view layer of the database system, the first access schema comprising one or more first database objects and one or more projection views, each projection view corresponding to a second database object of one or more second database objects in a data persistency of the database system;
   transitioning access of sessions of the application from the data persistency of the database system from direct access to access through the first access schema;
   executing at least a portion of the maintenance procedure in the database system, the at least a portion of the maintenance procedure:
      changing one or more second database objects within the data persistency,
      creating a second access schema, and
      transitioning access of the sessions of the application from the first access schema to the second access schema;
   transitioning access of the sessions of the application from access through the second access schema to the data persistency of the database system; and
   removing the second access schema and the view layer from the database system to provide direct access by the application to the data persistency without passing through any view layer between sessions of the application and the data persistency within the database system.

2. The method of claim 1, wherein each second database object in the one or more second database objects comprises content that one or more operations can be executed on.

3. The method of claim 1, wherein each first database object in the one or more first database objects is absent content that one or more operations can be executed on.

4. The method of claim 1, wherein transitioning access of sessions of an application from the data persistency of the database system to the first access schema comprises:
configuring a second database connection of a database interface of the application to connect sessions of the application to the first access schema; and
rolling sessions from a first database connection of the database interface to the second database connection.

5. The method of claim 1, wherein transitioning access of the sessions of the application from the second access schema to the data persistency of the database system comprises:
configuring a second database connection of a database interface of the application to connect sessions of the application to the data persistency; and
rolling sessions from a first database connection of the database interface to the second database connection.

6. The method of claim 1, wherein the one or more first database objects comprise one or more of a view, a filter rule, a dependency rule, and a stored procedure.

7. The method of claim 1, wherein providing a first access schema in a view layer of the database system comprises:
for each second database object comprising a table, creating a projection view to the table as a first database object of the one or more first database objects; and
for each second database object comprising a sequence, creating a synonym to the sequence as a first database object of the one or more first database objects.

8. A non-transitory computer-readable storage medium coupled to one or more processors and having instructions stored thereon which, when executed by the one or more processors, cause the one or more processors to perform operations for minimizing downtime during execution of a maintenance procedure of a database system, the operations comprising:
providing direct access by an application to a data persistency without passing through any view layer between sessions of the application and the data persistency within a database system;
adding a view layer in the database system as an intermediate layer between the application and the data persistency within the database system;
providing a first access schema in the view layer of the database system, the first access schema comprising one or more first database objects and one or more projection views, each projection view corresponding to a second database object of one or more second database objects in a data persistency of the database system;
transitioning access of sessions of the application from the data persistency of the database system from direct access to access through the first access schema;
executing at least a portion of the maintenance procedure in the database system, the at least a portion of the maintenance procedure:
changing one or more second database objects within the data persistency,
creating a second access schema, and
transitioning access of the sessions of the application from the first access schema to the second access schema;
transitioning access of the sessions of the application from access through the second access schema to the data persistency of the database system; and
removing the second access schema and the view layer from the database system to provide direct access by the application to the data persistency without passing through any view layer between sessions of the application and the data persistency within the database system.

9. The non-transitory computer-readable storage medium of claim 8, wherein each second database object in the one or more second database objects comprises content that one or more operations can be executed on.

10. The non-transitory computer-readable storage medium of claim 8, wherein each first database object in the one or more first database objects is absent content that one or more operations can be executed on.

11. The non-transitory computer-readable storage medium of claim 8, wherein transitioning access of sessions of an application from the data persistency of the database system to the first access schema comprises:
configuring a second database connection of a database interface of the application to connect sessions of the application to the first access schema; and
rolling sessions from a first database connection of the database interface to the second database connection.

12. The non-transitory computer-readable storage medium of claim 8, wherein transitioning access of the sessions of the application from the second access schema to the data persistency of the database system comprises:
configuring a second database connection of a database interface of the application to connect sessions of the application to the data persistency; and
rolling sessions from a first database connection of the database interface to the second database connection.

13. The non-transitory computer-readable storage medium of claim 8, wherein the one or more first database objects comprise one or more of a view, a filter rule, a dependency rule, and a stored procedure.

14. The non-transitory computer-readable storage medium of claim 8, wherein providing a first access schema in a view layer of the database system comprises:
for each second database object comprising a table, creating a projection view to the table as a first database object of the one or more first database objects; and
for each second database object comprising a sequence, creating a synonym to the sequence as a first database object of the one or more first database objects.

15. A system, comprising:
a computing device; and
a computer-readable storage device coupled to the computing device and having instructions stored thereon which, when executed by the computing device, cause the computing device to perform operations for natural language explanations for minimizing downtime during execution of a maintenance procedure of a database system, the operations comprising:
providing direct access by an application to a data persistency without passing through any view layer between sessions of the application and the data persistency within a database system;
adding a view layer in the database system as an intermediate layer between the application and the data persistency within the database system;
providing a first access schema in the view layer of the database system, the first access schema comprising one or more first database objects and one or more projection views, each projection view corresponding to a second database object of one or more second database objects in a data persistency of the database system;

transitioning access of sessions of the application from the data persistency of the database system from direct access to access through the first access schema;

executing at least a portion of the maintenance procedure in the database system, the at least a portion of the maintenance procedure:

changing one or more second database objects within the data persistency, creating a second access schema, and transitioning access of the sessions of the application from the first access schema to the second access schema;

transitioning access of the sessions of the application from access through the second access schema to the data persistency of the database system; and removing the second access schema and the view layer from the database system to provide direct access by the application to the data persistency without passing through any view layer between sessions of the application and the data persistency within the database system.

16. The system of claim 15, wherein each second database object in the one or more second database objects comprises content that one or more operations can be executed on.

17. The system of claim 15, wherein each first database object in the one or more first database objects is absent content that one or more operations can be executed on.

18. The system of claim 15, wherein transitioning access of sessions of an application from the data persistency of the database system to the first access schema comprises:

configuring a second database connection of a database interface of the application to connect sessions of the application to the first access schema; and rolling sessions from a first database connection of the database interface to the second database connection.

19. The system of claim 15, wherein transitioning access of the sessions of the application from the second access schema to the data persistency of the database system comprises:

configuring a second database connection of a database interface of the application to connect sessions of the application to the data persistency; and rolling sessions from a first database connection of the database interface to the second database connection.

20. The system of claim 15, wherein the one or more first database objects comprise one or more of a view, a filter rule, a dependency rule, and a stored procedure.

* * * * *